GREENWOOD & HUSTED.
Velocipede.
No. 86,339.  Patented Jan'y 26, 1869.
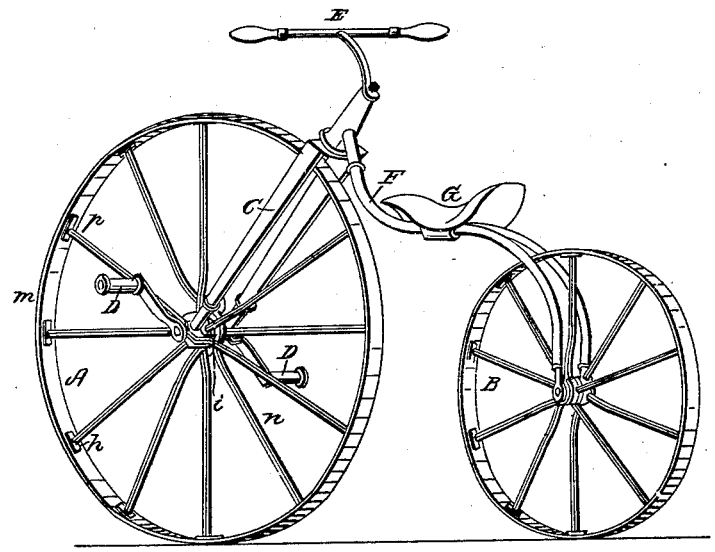

GEORGE D. GREENWOOD AND FRANK H. HUSTED, OF BUFFALO, NEW YORK.

*Letters Patent No. 86,339, dated January 26, 1869.*

IMPROVED VELOCIPEDE.

The Schedule referred to in these Letters Patent and making part of the same.

*To all whom it may concern:*

Be it known that we, GEORGE D. GREENWOOD and FRANK H. HUSTED, of the city of Buffalo, in the county of Erie, and State of New York, have invented a certain new and useful Improvement in Velocipedes; and we do hereby declare that the following is a full and exact description thereof, reference being had to the accompanying drawings, making part of this specification.

Our improvement relates to the method of steering the vehicle. Heretofore this has been effected by a divided bar, or standard, attached to the axle of the front wheel, and extending vertically upward, with a handle or tiller at the top, by which the wheel is turned in either direction, as required. With this construction of the steering-apparatus, a sudden turning of the wheel, when the vehicle is in rapid motion, causes a severe lateral strain on the forward wheel; besides, the short turning of the wheel brings the back portion of the rim of the wheel in contact with the leg, and soils the pants, while it also necessitates the removal of the foot from the stirrup on one side.

The object of our invention is to overcome these difficulties; and

The invention consists in inclining the steering-standard backward at an angle of about forty-five degrees, so that the wheel, when operated by the tiller, will be tipped or inclined to either side, at the same time it is partially turned. This inclining of the wheel induces it to describe a curve, as is well known, without requiring it to be twisted to one side to that degree which is otherwise required.

The accompanying drawing represents a perspective view of our improved velocipede.

A designates the forward wheel, which should be made considerably larger than the rear wheel, B.

C is the steering-standard, attached to the axle of the forward wheel in the usual manner.

D, the cranks at the ends of the axle, by which the vehicle is propelled.

E, the handle, or tiller, by which it is steered.

F, the reach, and

G, the saddle thereon.

Any suitable brake may be employed.

For ease of locomotion, the forward wheel should be made as large as practicable.

By making the wheels of about the relative sizes shown, and bending the reach, the seat can be brought comparatively low, while the lower portion of the legs, in operating the cranks, will be about in line with the standard, which will render it impossible for the wheel to come in contact with the leg in turning, and, as a consequence, there will be no necessity for removing the foot from the stirrup during the operation.

By means of our improved construction, the forward wheel, in turning the velocipede, is both inclined and and slightly twisted to one side, so that the inclination of the wheel in such case will be partially backward, so as to better withstand the momentum of the vehicle, which will tend to bring the wheel back to a perpendicular position, and thereby almost entirely relieve or prevent that strain to which the wheel would otherwise be subjected.

The effect of turning the forward wheels of a vehicle to one side while in motion, without inclining them, is exhibited in the frequent breaking of the forward axle or wheels of a carriage, if too suddenly turned when the vehicle is in rapid motion or heavily loaded.

Our improvement not only insures the safety of the vehicle and the rider, in turning, and relieves him of the inconvenience before stated, but also enables the rider to exert a greater force, when required, for propelling the velocipede up an ascent, or for attaining an increased speed, than can be exerted on a velocipede of the ordinary construction. This is due to the fact that the backward inclination of the steering-standard brings it nearly in a line parallel with the legs, and the direction in which the feet act in operating the cranks, so that, by holding fast to the handles of the tiller, a pushing force greater than the weight of the body can be exerted.

In the common form of velocipede, having the axis of the steering-standard vertical, the pressure of the rider's feet upon the cranks is so nearly at right angles to said axis, that a constant tendency to turn the driving-wheel alternately in opposite directions is exerted, which must be resisted by the application of a counter-force to the tiller, requiring both skill and strength.

The inclined position of the standard remedies this difficulty, by reason of its bringing the axis thereof so nearly in line with the direction of pressure of the driver's feet upon the cranks, that no tendency to lateral turning exists. It further brings said axis so near the seat, that a very considerable turning and tipping of the driving-wheel may take place, without the same striking or interfering with the rider's legs, or requiring removal of his feet from the crank.

The wheels are composed of a cast-iron hub, *l*, with an iron rim or felloe, *m*, and spokes, *n n*, of small gas-pipe, having right and left threads cut at their ends, so as to screw into the hub and into sockets *p*, screwed or bolted to the felloe.

This construction enables the spokes to be readily tightened, by simply giving them a turn by means of suitable tongs.

The strength of the wheel itself is much increased, while it can be produced at a greatly-reduced cost over the ordinary wooden ones.

What we claim as our invention, and desire to secure by Letters Patent, is—

The turning-standard C, inclined backward at an angle of forty-five degrees, for the purpose of tipping the wheel, and thereby facilitating the turning thereof, substantially as set forth.

GEO. D. GREENWOOD.
FRANK H. HUSTED.

Witnesses:
 N. HYATT,
 JAY HYATT.